United States Patent
Cho (10) Patent No.: US 7,706,818 B2
(45) Date of Patent: Apr. 27, 2010

(54) METHOD OF RESPONDING TO A CALL AND MOBILE COMMUNICATION TERMINAL FOR IMPLEMENTING THE SAME

(75) Inventor: Sang Hyun Cho, Seoul (KR)

(73) Assignee: LG Electronics, Inc., Seoul (KR)

( * ) Notice: Subject to any disclaimer, the term of this patent is extended or adjusted under 35 U.S.C. 154(b) by 198 days.

(21) Appl. No.: 11/566,016

(22) Filed: Dec. 1, 2006

(65) Prior Publication Data

US 2008/0132253 A1    Jun. 5, 2008

(51) Int. Cl.
*H04Q 7/20* (2006.01)
*H04B 1/38* (2006.01)

(52) U.S. Cl. ........................ 455/466; 455/566

(58) Field of Classification Search .............. 455/466, 455/566
See application file for complete search history.

(56) References Cited

U.S. PATENT DOCUMENTS

2002/0058500 A1* 5/2002 Higuchi et al. .............. 455/412
2004/0203613 A1* 10/2004 Zhu et al. .................... 455/413
2005/0198096 A1* 9/2005 Shaffer et al. ............... 709/200
2007/0039036 A1* 2/2007 Sullivan et al. ............. 725/133

FOREIGN PATENT DOCUMENTS

| KR | 10-2000-0063774 | 6/2000 |
| KR | 10-2004-0004766 | 1/2004 |
| KR | 10-2004-0044839 | 5/2005 |
| KR | 10-2006-0035826 | 4/2006 |

* cited by examiner

*Primary Examiner*—Nick Corsaro
*Assistant Examiner*—Joseph Dean, Jr.
(74) *Attorney, Agent, or Firm*—Lee, Hong, Degerman, Kang & Waimey (57) ABSTRACT

A method of responding to a call and mobile communication terminal implementing the same are disclosed. The present invention includes a call request receiving step of receiving a call request from a calling party, a text message preparing step of preparing a text message, and a message communication step of converting the prepared text message to a voice message and transmitting the voice message. Accordingly, in case that a terminal user has difficulty in answering an incoming call from a calling party or intends to continue using the mobile communication terminal prior to receiving the incoming call, the terminal user is able to continue having a conversation using a text message.

14 Claims, 7 Drawing Sheets

METHOD OF RESPONDING TO A CALL AND MOBILE COMMUNICATION TERMINAL FOR IMPLEMENTING THE SAME

BACKGROUND OF THE INVENTION

1. Field of the Invention

The present invention relates to a mobile communication terminal, and more particularly, to a method of responding to a call and mobile communication terminal for implementing the same. Although the present invention is suitable for a wide scope of applications, it is particularly suitable for responding to a call received from a calling party.

2. Discussion of the Related Art

Generally, remarkable developments in the information communication technology bring rapid transitions of information and communication environments. A mobile terminal capable of mobile communications such as a mobile phone and the like is regarded as a necessity in a modern society to be globally used. In order to meet the user's demand according to the base expansion of the mobile terminal, various functions including broadcast reception, multimedia contents playback, web-browsing, picture (moving picture or still picture) photographing and the like as well as a general voice calling are provided to the mobile terminal.

Meanwhile, it happens that a user may have difficulty in answering a phone from a calling party in the course of conference, movie viewing or the like. Moreover, while a user views a broadcast or multimedia contents (e.g., MP3, moving pictures), performs web browsing, photographs pictures, or the like, if an incoming call takes place, a user occasionally wants to respond to the incoming call while keeping the present work processed by a mobile communication terminal.

SUMMARY OF THE INVENTION

Accordingly, the present invention is directed to a method of responding to a call and mobile communication terminal implementing the same that substantially obviate one or more problems due to limitations and disadvantages of the related art.

An object of the present invention is to provide a method of responding to a call and mobile communication terminal implementing the same, by which a terminal user is able to conveniently respond to an incoming call in case that the terminal user has difficulty in answering the incoming call by making a sound or intends to keep doing a previous work processed prior to the incoming call by the mobile communication terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of responding to a call in a mobile communication terminal according to the present invention includes a call request receiving step of receiving a call request from a calling party, a text message preparing step of preparing a text message, and a message communication step of converting the prepared text message to a voice message and transmitting the voice message.

In another aspect of the present invention, a mobile communication terminal includes a mobile communication unit, a display unit, an input unit, a memory unit, and a control unit preparing a text message to respond to a call if a call request is received from a calling party, the control unit controlling the prepared text message to be converted to a voice message, the control unit controlling the voice message to be transmitted to the calling party.

In another aspect of the present invention, a method of responding to a call in a mobile communication terminal includes a call request receiving step of receiving a call request from a calling party, an inquiry window activating step of activating an inquiry window inquiring whether to respond to the call with a text call, a call connection establishing step of establishing a call connection to the calling party if the text call is selected, a text message window activating step of activating a text message window, a text message inputting step of inputting a text message to the text message window, a message converting step of converting the inputted text message to a voice message, and a message transmitting step of transmitting the voice message to the calling party.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
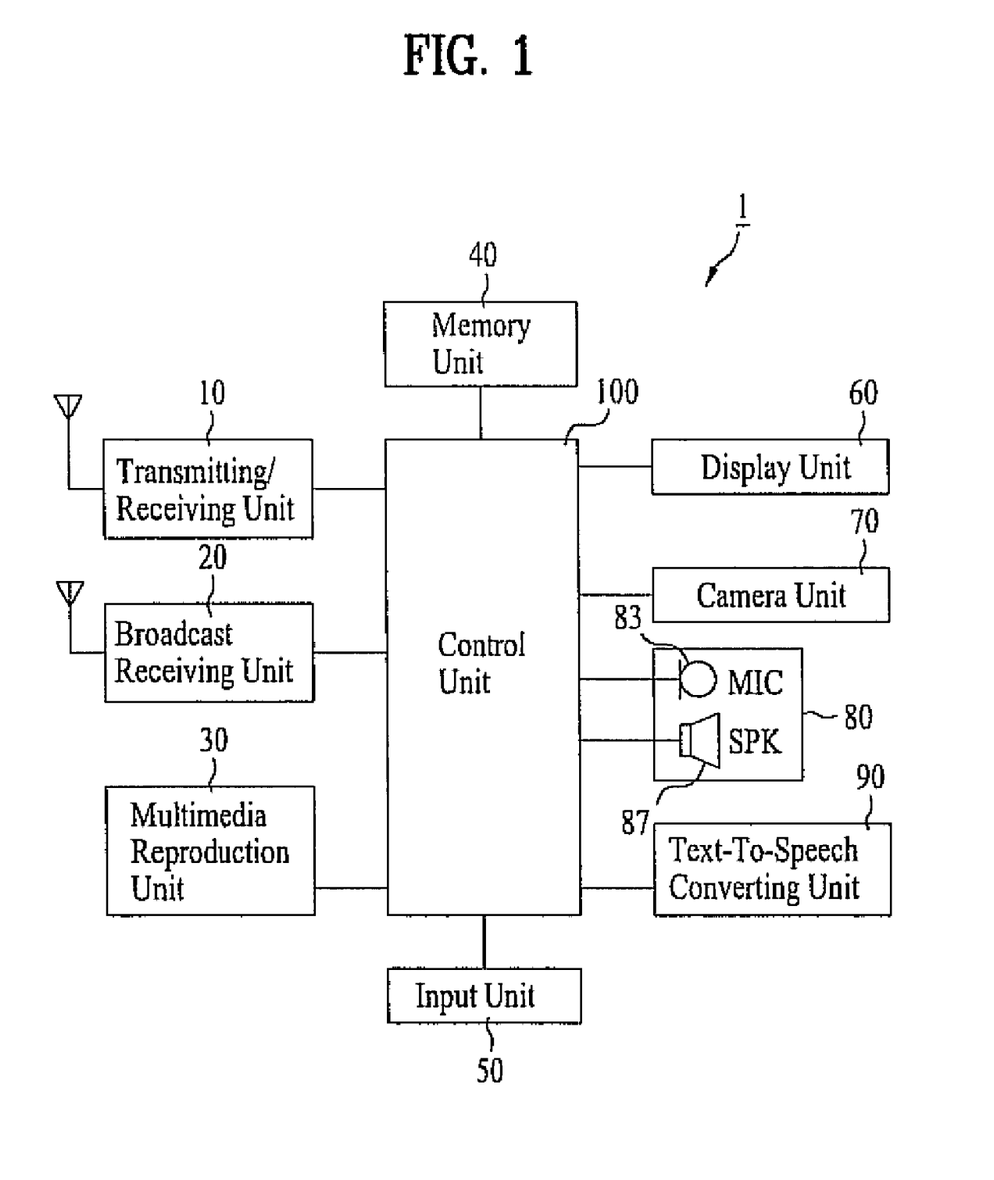
FIG. 1 is a schematic block diagram of a configuration of a mobile communication terminal according to the present invention.

FIG. 1 is a schematic block diagram of a configuration of a mobile communication terminal according to the present invention.

Referring to FIG. 1, a mobile communication terminal 1 includes a mobile communication transmitting/receiving unit 10, a broadcast receiving unit 20, a multimedia reproduction unit 30, a memory unit 40, an input unit 50, a display unit 60, a camera unit 70, an audio input/output unit 80, a text-to-speech converting unit 90, and a control unit 100. The elements of the present invention can be implemented in a manner that at least two of the elements are combined into one element or that one of the elements is divided into at least two sub-elements.

The mobile communication transmitting/receiving unit 10 transmits/receives a wireless signal by accessing an external mobile communication network, enabling the mobile communication terminal 1 to perform mobile communications. In the present invention, the mobile communications refer to a concept of telephone communication with another person(s) as well as wireless internet web browsing.

The broadcast receiving unit 20 is capable of receiving various broadcasts. In this case, the broadcasts is not limited to terrestrial Digital Television (DTV) and satellite DTV but can be extended to a mobile broadcasting such as MediaFlo of U.S.A., a digital multimedia broadcasting (DMB) of Korea, a digital video broadcasting handheld (DVB-H) of EU, and an integrated services digital broadcasting terrestrial (ISDB-T). The broadcast receiving unit 20 is an essential element in implementing a call responding method according to the present invention in the course of a broadcast reception. However, if the call responding method is not to be implemented, then the broadcast receiving unit 20 can be omitted.

The multimedia contents playing unit (hereinafter referred to as 'multimedia reproduction unit') 30 plays back multimedia contents stored in the memory unit 40 or real-time multimedia contents downloaded via the mobile communication network. The multimedia reproduction unit 30 further provides the played multimedia contents to a user via the display unit 60 and a speaker 87 of the audio input/output unit 80. The multimedia reproduction unit 30 is an essential element in implementing a call responding method according to the present invention in the course of the multimedia contents playback. However, if the call responding method is not to be implemented, then the multimedia reproduction unit 30 can be omitted.

The memory unit 40 stores various types of software to implement various functions provided by the mobile communication terminal 1 and stores various data corresponding to the software. The memory unit 40 is capable of storing multimedia contents (e.g., MP3, moving pictures) that can be played back by the multimedia reproduction unit 30. The memory unit 40 is also capable of storing a prepared text message or a text message having been transmitted to another party according to the call responding method. Details of the text message will be explained later.

Further, voice feature information of a terminal user can be stored in the memory unit 40. In this case, when the text message is converted to a voice message, the voice feature information is for enabling the voice message to be copied or converted to terminal user's voice. This will be explained later.

The input unit 50 enables a terminal user to input various commands or information to the mobile communication terminal 1 with an exception of an audio input. The audio input is carried out via a microphone 83 of the audio input/output unit 80.

The display unit 60 displays pictures necessary for implementing various functions of the mobile communication terminal 1. The display unit 60 can further display a voice received from another party into a text message during a phone conversation. This will be explained later.

The camera unit 70 enables a terminal user to take various moving or still pictures via the mobile communication terminal 1. The taken pictures are stored in the memory unit 40 and then played back via the multimedia reproduction unit 30. The camera unit 70 is an essential element in implementing a call responding method according to the present invention in the course of photographing pictures. However, if the call responding method is not to be implemented, then the camera unit 70 can be omitted.

The audio input/output unit 80 includes the microphone 83 to input a user's voice into the terminal, and the speaker (or, earphone) 87 for providing the voice outputted from the terminal to the user.

The text-to-speech converting unit 90 includes a text-to-speech (TTS) module for converting a text message to a voice message. Further, the mobile communication terminal 1 is able to convert a text message, which is either inputted by a user or stored in the memory unit 40, to a voice message. The converted voice message can be transmitted to a specified party via the mobile communication transmitting/receiving unit 10. Preferably, the text-to-speech converting unit 90 is able to further include a speech-to-text (STT) module for converting the specified party's speech to a text message by recognizing the specified party's speech. If a mobile communication network is configured to provide a text-to-speech converting function, then the text-to-speech converting unit 90 can be omitted from the mobile communication terminal 1.

Lastly, the control unit 100 enables a call responding method according to the present invention to be implemented in the mobile communication terminal 1 by controlling the mobile communication transmitting/receiving unit 10, the broadcast receiving unit 20, the multimedia reproduction unit 30, the memory unit 40, the input unit 50, the display unit 60, the camera unit 70, the audio input/output unit 80 and the text-to-speech converting unit 90.

A method of responding to a call in the above-configured mobile communication terminal 1 according to the present invention is explained with reference to the attached drawings as follows.

First Embodiment

Figure 2:
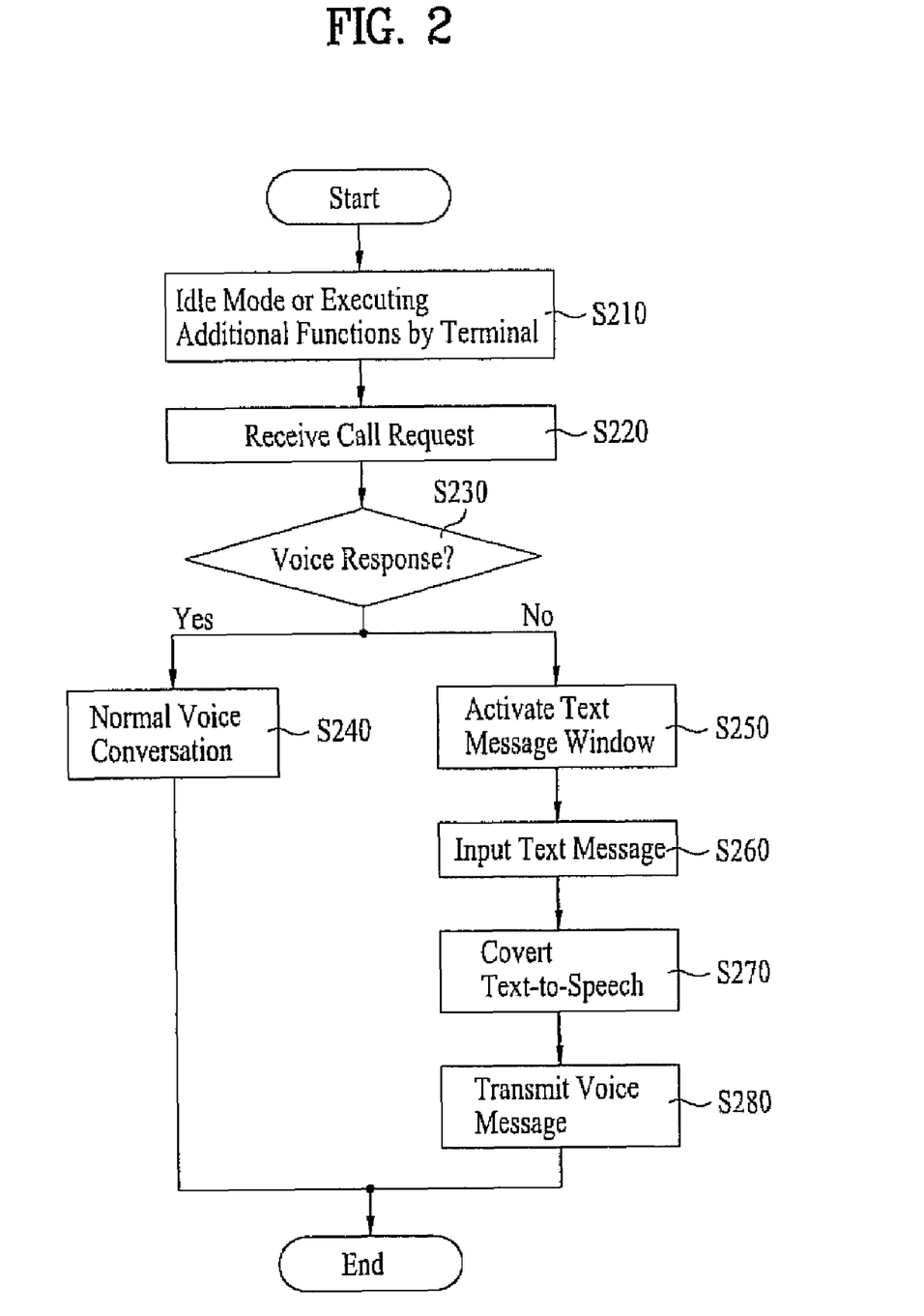
FIG. 2 is a schematic flowchart of a method of responding to a call according to a first embodiment of the present invention.
Figure 3:
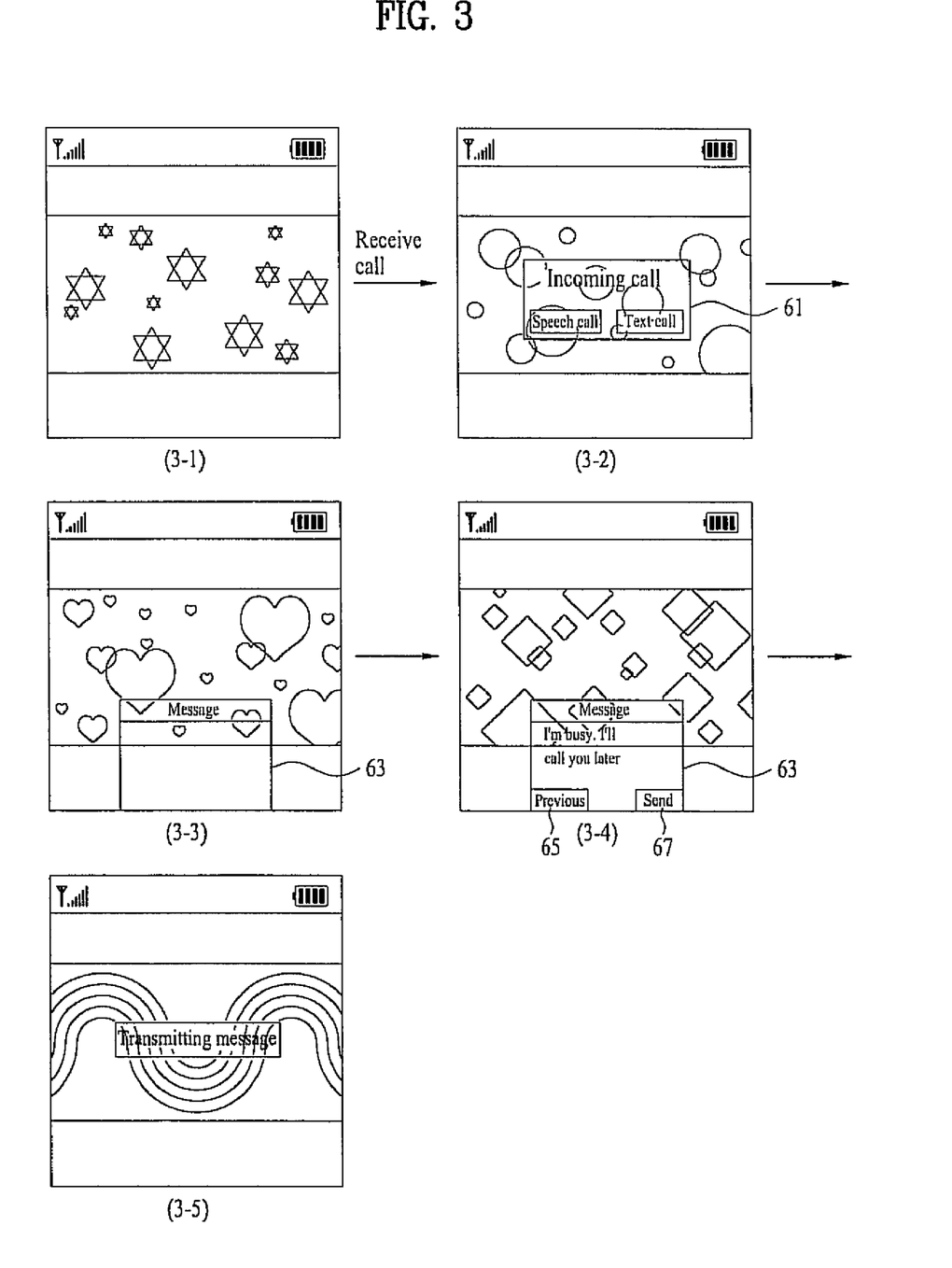
FIG. 3 is a diagram of picture transitions on a display unit of a mobile communication terminal according to a first embodiment of the present invention.

FIG. 2 is a schematic flowchart of a method of responding to a call according to a first embodiment of the present invention. FIG. 3 is a diagram of picture transitions on a display unit of a mobile communication terminal according to a first embodiment of the present invention.

A terminal user, who is attending a meeting or conference or viewing a movie, for example, can encounter difficulty in receiving an incoming call from a caller. In particular, even if a mobile communication terminal is in a standby mode (i.e., idle mode or slotted mode), the terminal user may be in an awkward situation to answer a phone.

Furthermore, if the terminal user receives a call while viewing a broadcast or multimedia contents (e.g., MP3 or moving picture), browsing a web, or taking pictures using the mobile communication terminal, the terminal user may wish to respond to the incoming call while continuing to use the current function at the mobile communication terminal. Here, the broadcast viewing function, multimedia contents playing function, web browsing function, photographing function and the like can be referred to as 'additional functions'.

As mentioned above, while the mobile communication terminal is in a standby mode or operating its additional function(s), a process for executing a method of responding to a call according to a first embodiment of the present invention is explained as follows. In the following description, it is assumed that the mobile communication terminal is executing the broadcast viewing function among the additional functions in the standby mode.

The mobile communication terminal receives a broadcast, as shown in (3-1) of FIG. 3, and then reproduces the received broadcast for a terminal user via the display unit 60 and the speaker 87 [S210].

While the terminal user is viewing the reproduced broadcast, the mobile communication terminal 1 receives a call or a call request from an external source (i.e., another caller) [S220].

If the call request is received, the mobile communication terminal 1, as shown in (3-2) of FIG. 3, activates an inquiry window 61 on the display unit 60 to inquire as to whether the user wishes to respond to the call request using a speech call or a text call feature [S230]. Preferably, the inquiry window 61 is provided to one side of the display unit and/or configured semi-transparent so that viewing of the current display is not blocked. However, the placement of the inquiry window 61 is not limited to any one specific side of the display unit but can be placed anywhere on the display unit. Further, it is preferable that the size of the inquiry window 61 is smaller than the size of the entire screen on the display unit 60. In (3-2) of FIG. 3, for example, the inquiry window 61 is configured semi-transparent and occupies a specified portion on the screen.

During the call request, the received broadcast continues to be reproduced via the display unit 60 and the speaker 87 of the terminal without interruption. Since the inquiry window 61 is provided to one side of the display unit and configured semi-transparent, the terminal user is able to make a specific selection on the inquiry window 61 while viewing the broadcast.

If the terminal user selects the speech call via the input unit 50, the mobile communication terminal 1 establishes a call connection to the calling party and enables the terminal user to respond to the call and carry on a normal conversation [S240].

Alternatively, if the terminal user selects the text call, the mobile communication terminal 1 establishes a call connection with the calling party and enables the terminal user to perform the text call through the following procedure. Here, the text call should be executed while the mobile communication terminal keeps reproducing the received broadcast for the terminal user via the display unit 60 and the speaker 87.

When the text call is activated, the mobile communication terminal 1, as shown in (3-3) of FIG. 3, activates a text message window 63 on the screen of the display unit 60 [S250]. Similar to the inquiry window 61, the text message window 63 is preferably provided to one side of the display unit and/or configured semi-transparent. Moreover, the text message window 63 has a size smaller than the size of the display unit, preferably. Further, the size and/or position of the text message window 63 can be adjusted by the terminal user. In (3-3) of FIG. 3, the text message window is configured semi-transparent on a lower end side of the screen, for example.

On the text message window 63, the terminal user can input a text message via the input unit 50, as shown in (3-4) of FIG. 3, to be delivered to the calling party [S260]. The input of the text message can be conducted in a manner of calling a text message, which had been written and transmitted and was then stored in the memory unit 40, in the text message window.

After the text message is written, if a 'transmission' button 67 is selected, the written text message is converted to a voice message by the text-to-speech converting unit 90. Preferably, the text-to-speech converting unit 90 is configured to convert the text message to the voice message copied into the terminal user's voice by referring to the terminal user's voice feature information stored in the memory unit 40.

Subsequently, the voice message, as shown in (3-5) of FIG. 3, is transmitted to the calling party (or a caller) [S280].

As mentioned above, the terminal user is able to respond to the external call while viewing the received broadcast.

Second Embodiment

Figure 4:
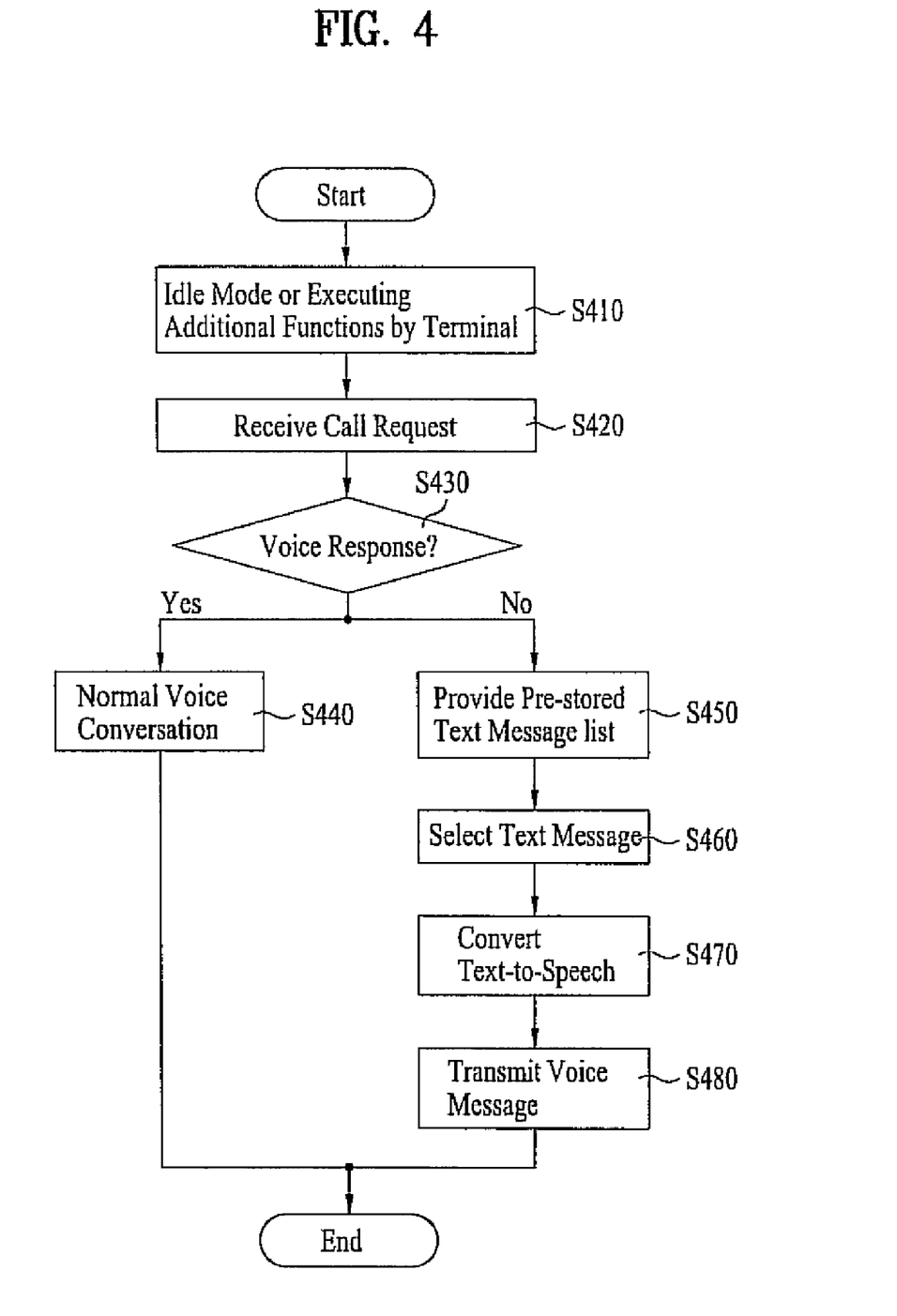
FIG. 4 is a schematic flowchart of a method of responding to a call according to a second embodiment of the present invention.
Figure 5:
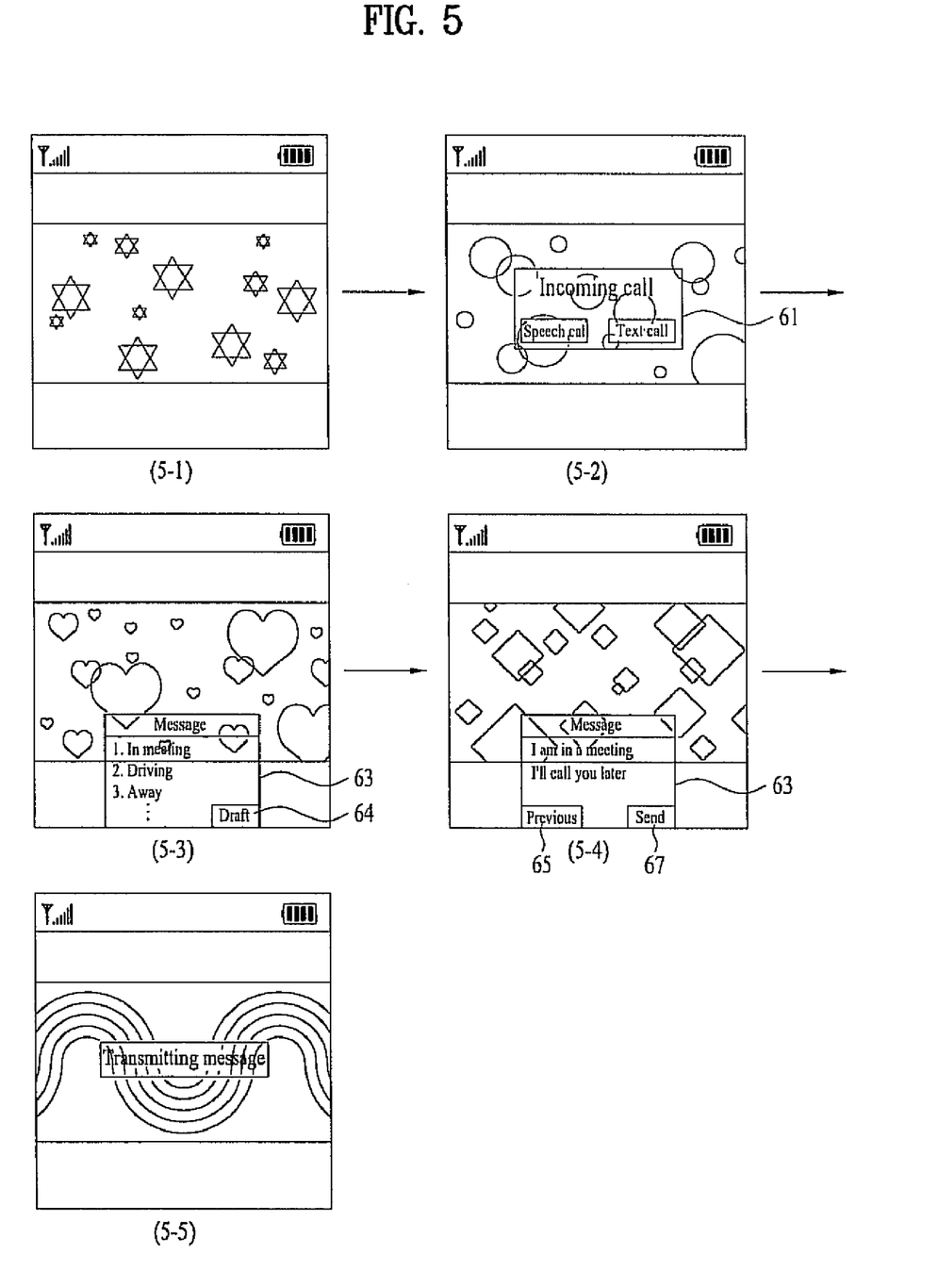
FIG. 5 is a diagram of picture transitions on a display unit of a mobile communication terminal according to a second embodiment of the present invention.

FIG. 4 is a schematic flowchart of a method of responding to a call according to a second embodiment of the present invention, and FIG. 5 is a diagram of picture transitions on a display unit of a mobile communication terminal according to a second embodiment of the present invention.

While the mobile communication terminal is in a standby mode or executing its additional function, a process for executing a method of responding to a call according to a second embodiment of the present invention is explained as follows. In the following description, similar to the first embodiment of the present invention, it is assumed that the mobile communication terminal is executing the broadcast viewing function among the additional functions in the standby mode.

The mobile communication terminal receives a broadcast, as shown in (5-1) of FIG. 5, and then reproduces the received broadcast for a terminal user via the display unit 60 and the speaker 87 [S410].

While the terminal user is viewing the reproduced broadcast, the mobile communication terminal 1 receives a call request from an external source (i.e., calling party) [S420].

If the call request is received, the mobile communication terminal 1, as shown in (5-2) of FIG. 5, activates an inquiry window 61 on a screen of the display unit 60 to inquire as to whether the user wishes to respond to the call request by using a speech call or a text call feature [S430].

Preferably, similar to the first embodiment of the present invention, the inquiry window 61 is provided to one side of the display unit and/or configured semi-transparent so that viewing of the current display is not blocked. Again, the placement of the inquiry window 61 is not limited to any one specific side of the display unit but can be place anywhere on the display unit. Further, it is preferable that the size of the inquiry window 61 is smaller than the size of the entire screen on the display unit 60. In (5-2) of FIG. 5, for example, the inquiry window 61 is configured semi-transparent and occupies a specified portion on the screen.

If the terminal user selects the speech call via the input unit 50, the mobile communication terminal 1 establishes a call connection to the calling party and enables the terminal user to respond to the call and carry on a normal conversation [S440].

Alternatively, if the terminal user selects the text call, the mobile communication terminal 1 establishes a call connection with the calling party and enables the terminal user to perform the text call through the following procedure. Here, the text call should be executed while the mobile communication terminal keeps reproducing the received broadcast for the terminal user via the display unit 60 and the speaker 87.

When the text call is activated, the mobile communication terminal 1, as shown in (5-3) of FIG. 5, provides a list of text messages selectable by the terminal user via a text message window 63 on the screen of the display unit 60 [S450]. In this case, the text messages in the list are prepared by a terminal manufacturer or a terminal user in advance.

The text message window, similar to the first embodiment of the present invention, is preferably provided to one side of the display unit and/or configured semi-transparent. Moreover, the text message window 63 has a size smaller than the size of the display unit, preferably. Further, the size and/or position of the text message window 63 can be adjusted by the terminal user. In (5-3) of FIG. 5, the text message window is configured semi-transparent on a left lower end side of the screen, for example.

Subsequently, the terminal user selects a specific one of the text messages via the input unit 50 [S460]. If the specific text message does not exist in the list, the terminal user selects a 'write' or 'draft' button 64. As mentioned in the foregoing description of the first embodiment of the present invention, the terminal user is able to directly write/draft a specific text message on the text message window. The direct write of the text message is explained in the description of the first embodiment of the present invention, which is omitted for the conciseness of the specification.

If the specific text message is selected from the list by the terminal user, a content of the selected text message, as shown in (5-4) of FIG. 5, is displayed. Hence, the terminal user is able to confirm the content of the selected specific text message.

After the content of the selected text message has been confirmed, if the terminal user selects a 'send' button 67, the selected text message is converted to a voice message by the text-to-speech converting unit 90 [S470]. Preferably, the text-to-speech converting unit 90 is configured to convert the text message to the voice message copied into the terminal user's voice by referring to the terminal user's voice feature information stored in the memory unit 40.

Subsequently, the voice message, as shown in (5-5) of FIG. 5, is transmitted to the calling party [S480].

Third Embodiment

Figure 6:
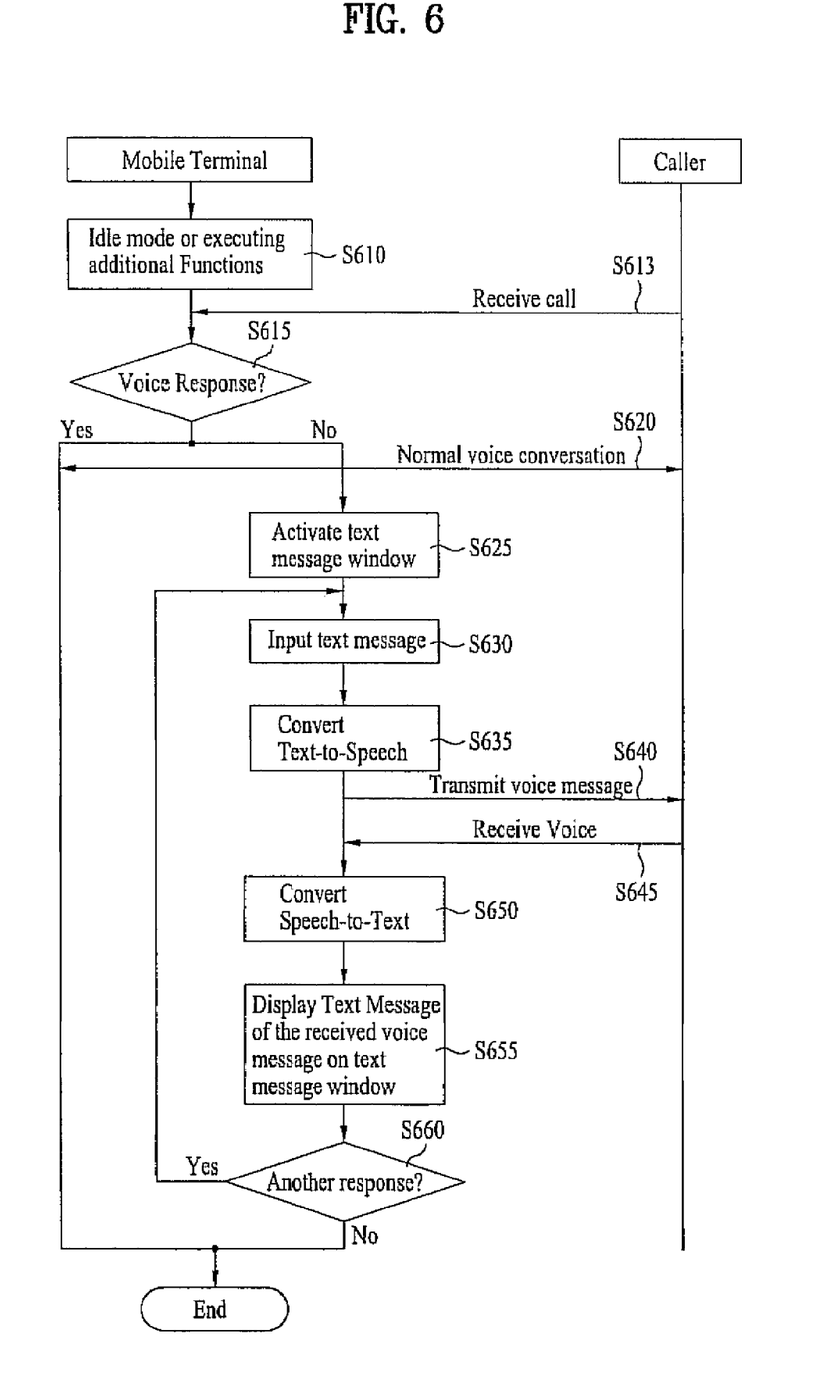
FIG. 6 is a schematic flowchart of a method of responding to a call according to a third embodiment of the present invention.
Figure 7:
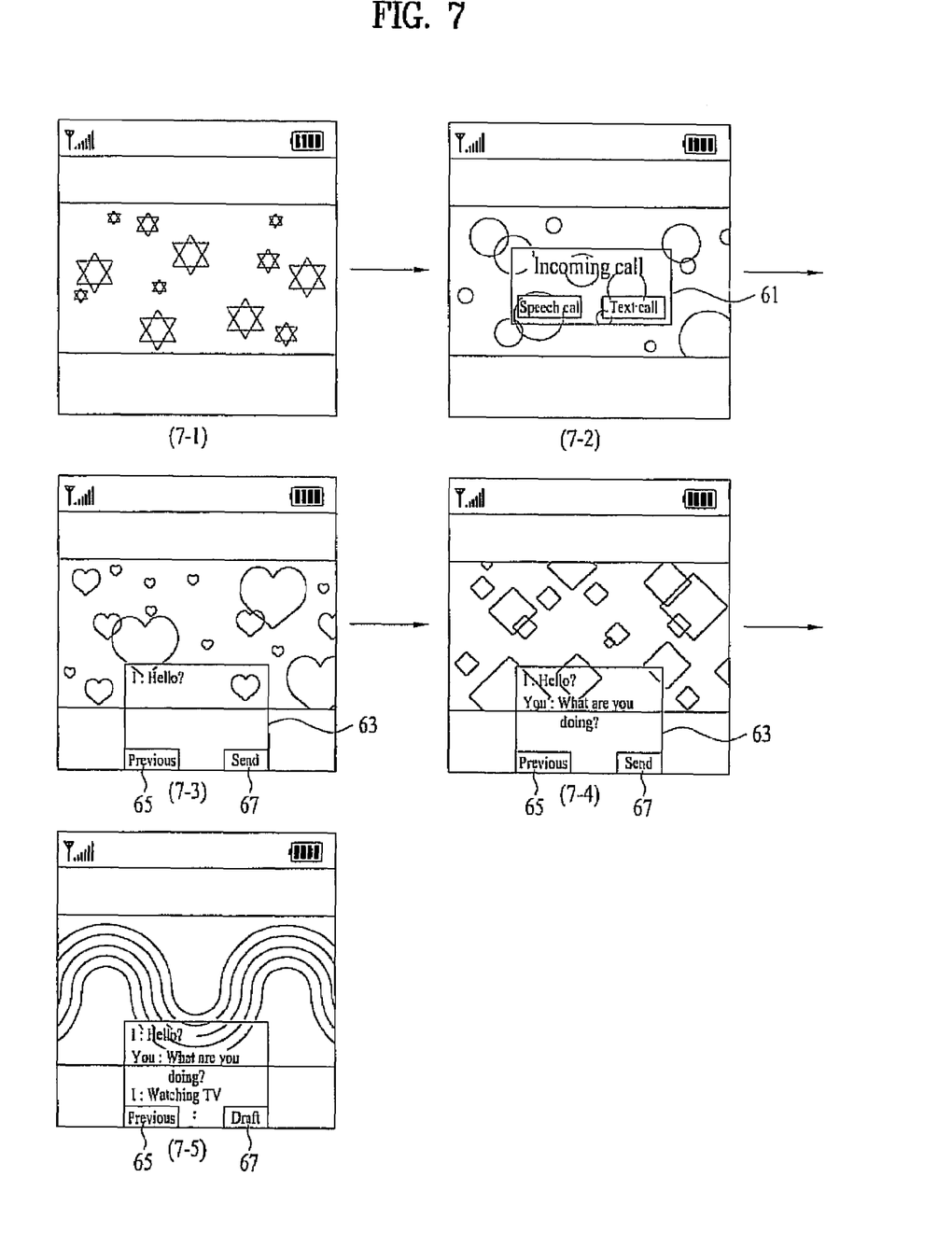
FIG. 7 is a diagram of picture transitions on a display unit of a mobile communication terminal according to a third embodiment of the present invention.

FIG. 6 is a schematic flowchart of a method of responding to a call according to a third embodiment of the present invention, and FIG. 7 is a diagram of picture transitions on a display unit of a mobile communication terminal according to a third embodiment of the present invention.

While the mobile communication terminal is in a standby mode or executing additional function(s), a process for executing a method of responding to a call according to a third embodiment of the present invention is explained as follows. In the following description, similar to the first embodiment of the present invention, it is assumed that the mobile communication terminal is executing the broadcast viewing function among the additional functions in the standby mode.

The mobile communication terminal receives a broadcast, as shown in (7-1) of FIG. 7, and then reproduces the received broadcast for a terminal user via the display unit 60 and the speaker 87 [S610].

While the terminal user is viewing the reproduced broadcast in this situation, the mobile communication terminal 1 receives a call or a call request from an external source (i.e., calling party) [S613].

If the call request is received, the mobile communication terminal 1, as shown in (7-2) of FIG. 7, activates an inquiry window 61 on a screen of the display unit 60 to inquire as to whether the user wishes to respond to the call request by using a speech call or a text call feature [S615].

If the terminal user selects the speech call via the input unit 50, the mobile communication terminal 1 enables the terminal user to respond to the call from the calling party through a normal voice conversation by telephone [S620].

Alternatively, if the terminal user selects the text call, the terminal user writes a specific text message via the text message window 63. The text message is converted to a voice message and is then transmitted to the calling party [S625, S630, S635, S640]. This is the same description of the first embodiment of the present invention, which will be omitted for the conciseness of the present invention.

Subsequently, the mobile communication terminal receives the voice of the calling party responding to the voice message, converts the voice to a text message, and then displays the corresponding text message on the text message window [S645, S650, S655].

If necessary, the terminal user, as shown in (7-5) of FIG. 7, is able to input a new text message in response to the former text message corresponding to the received voice and then transmit the new text message [S660, S630].

Thus, the terminal user is able to have a conversation with the calling party (or an original caller) with the text messages while continuing to view the broadcast.

Accordingly, the present invention provides the following effect or advantages.

In case that a terminal user has difficulty in answering an incoming call from a calling party or intends to continue using the mobile communication terminal functions prior to the incoming call, the terminal user can continue to have phone a conversation using a text message. Hence, the convenience in using the mobile communication terminal can be enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of responding to a call in a mobile communication terminal, comprising:
    receiving the call from a calling party while performing an operation in the mobile communication terminal;
    preparing a text message in the mobile communication terminal while continuing to perform the operation, the text message input by a user via a text message window displayed at the mobile communication terminal when the user attempts to respond to the call with the text message; and
    converting the prepared text message to a voice message and transmitting the voice message to the calling party while continuing to perform the operation,
    wherein the operation is at least one selected from the group consisting of a web browsing operation, a broadcast receiving operation, a multimedia content playing operation, and a taking photograph operation.

2. The method of claim 1, wherein the call is received while the mobile communication terminal is in an idle mode.

3. The method of claim 1, wherein preparing the text message further comprises:
    selecting one of at least one text message stored in the mobile communication terminal.

4. The method of claim 1, wherein the text message is converted to the voice message corresponding to a voice of the user using prepared voice feature information of the user.

5. The method of claim 1, further comprising receiving a voice from the calling party and converting the voice to a text message to be displayed on the text message window.

6. The method of claim 1, wherein the text message window is semi-transparent.

7. The method of claim 1, wherein at least one of a size and a position of the text message window is adjustable by the user.

8. A mobile communication terminal comprising:
- a mobile communication unit for transmitting and receiving information;
- a display unit for displaying information;
- an input unit for receiving user input;
- a memory unit for storing information; and
- a control unit for preparing a text message to respond to a call when the call is received from a calling party, converting the prepared text message to a voice message, and transmitting the voice message to the calling party,
- wherein an operation performed by the mobile communication terminal prior to receiving the call continues to be performed by the control unit while the text message is prepared, the prepared text message is converted to the voice message, and the voice message is transmitted to the calling party,
- wherein the operation is at least one selected from the group consisting of a web browsing operation, a broadcast receiving operation, a multimedia content playing operation, and a taking photograph operation, and
- wherein the text message is prepared by activating a text message window and receiving the text message input by a user via the activated text message window when the user attempts to respond to the call with the text message.

9. The mobile communication terminal of claim 8, further comprising at least one selected from the group consisting of a broadcast receiving unit, a multimedia reproduction unit, and a camera unit, wherein the call is received when an idle operation or slotted mode operation is executed.

10. The mobile communication terminal of claim 8, wherein at least one text message is stored in the memory unit and the text message is prepared by selecting one of the stored at least one text message.

11. The mobile communication terminal of claim 8, wherein the memory unit stores voice feature information of the user and a voice of the voice message corresponds to a voice of the user.

12. The mobile communication terminal of claim 8, wherein the control unit is configure to convert a voice received from the calling party to a text message and display the text message on the text message window.

13. The mobile communication terminal of claim 8, wherein at least one of a size and a position of the text message window is adjustable by the user.

14. A method of responding to a call in a mobile communication terminal, comprising;
- receiving the call from a calling party while performing an operation in the mobile communication terminal;
- activating an inquiry window inquiring whether to respond to the call with a text call;
- establishing a call connection to the calling party responsive to selection of the text call by a user;
- activating a text message window of the mobile communication terminal;
- receiving a text message via the text message window;
- converting the received text message to a voice message; and
- transmitting the voice message to the calling party,
- wherein activating the inquiry window, establishing the call connection, activating the text message window, receiving the text message, converting the received text message, and transmitting the voice message are performed while the operation continues to be performed in the mobile communication terminal,
- wherein the operation is at least one selected from the group consisting of a web browsing operation, a broadcast receiving operation, a multimedia content playing operation, and a taking photograph operation.

* * * * *